May 16, 1933.  A. S. T. LAGAARD  1,909,771
EGG CASE FILLER
Filed Sept. 17, 1931
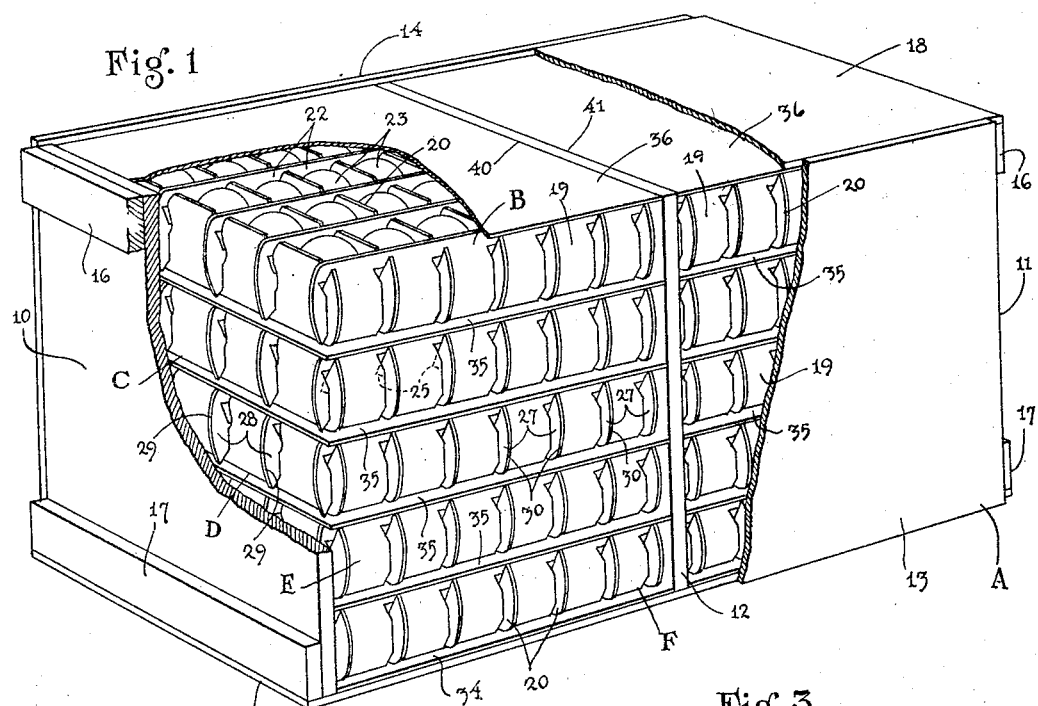
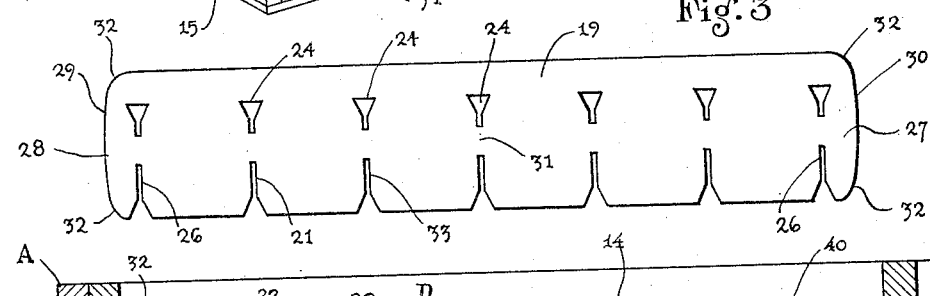
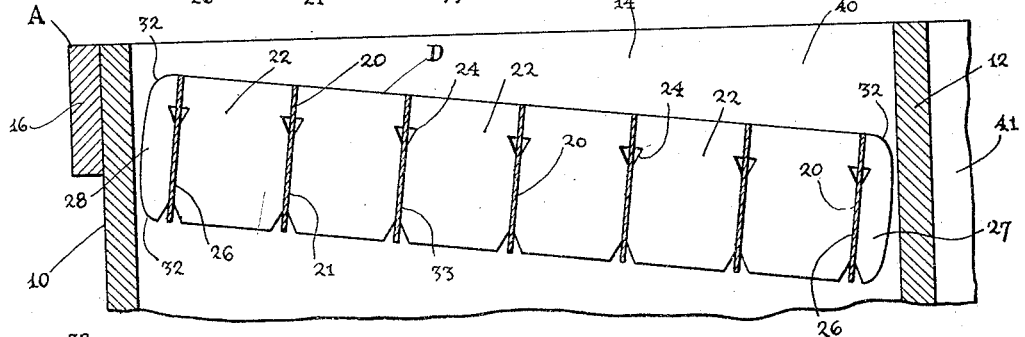
Inventor
Alexander S. T. Lagaard
By Caswell & Lagaard
Attorneys Patented May 16, 1933

1,909,771

UNITED STATES PATENT OFFICE

ALEXANDER S. T. LAGAARD, OF MINNEAPOLIS, MINNESOTA, ASSIGNOR TO J. WARREN LENNON, OF ST. PAUL, MINNESOTA

EGG CASE FILLER

Application filed September 17, 1931. Serial No. 563,250.

My invention relates to egg case fillers and has for its object to provide a filler which may be easily inserted into and removed from an ordinary egg case.

Another object of the invention resides in providing an egg case filler which may be inserted into the egg case while in diagonal position without causing binding at the corners of the filler.

An object of the invention resides in constructing the filler with spaced intersecting partitions and in constructing one or both of the sets of partitions so that the length of each partition measured along any line through the center of the partition will be less than the corresponding dimension of the case.

A still further object of the invention resides in constructing one or both sets of partitions with arcuate edges at the ends thereof, the center of one of said edges being located at a point between the opposite end of the partition and the first intersecting partition adjacent the medial plane thereof.

A feature of the invention resides in locating said center along a line parallel to the upper and lower edges of the partition and midway therebetween.

Another object of the invention resides in constructing the arcuate edges at the ends of said partitions with radii substantially equal to one half or slightly less than the corresponding inner dimension of the box.

A feature of the invention resides in constructing the ends of the partitions with two degrees of curvature.

Other objects of the invention reside in the novel combination and arrangement of parts and in the details of construction hereinafter illustrated and/or described.

In the drawing:

Fig. 1 is a perspective view of an egg case illustrating an embodiment of my invention applied thereto.

Fig. 2 is a fragmentary sectional view taken through a portion of the egg case and illustrating the method of applying the fillers thereto.

Fig. 3 is an elevational view of one of the partitions used in forming the fillers of my invention.

Fig. 4 is a fragmentary view similar to Fig. 3 and illustrating a modification of my invention.

In the placing of egg case fillers in egg cases, considerable difficulty is encountered when the fillers are twisted or are not moved out of or into the case in parallel relation to the bottom thereof. In the handling of eggs, the eggs are frequently removed within the filler by giving the filler a slight twist which causes the eggs to be held between the partitions thereof until replaced or deposited wherever desired. When the fillers are so twisted, considerable difficulty is encountered, as stated, in removing or replacing the fillers, causing the eggs to drop or become broken. The present invention provides a filler whereby these various disadvantages are overcome and in which the eggs may be readily removed while within the filler.

For the purpose of illustrating my invention I have shown an ordinary egg case which I have indicated in its entirety at A. This egg case consists of two ends 10 and 11 and an intermediate partition 12, which walls have attached to them, sides 13 and 14 and a bottom 15 forming two compartments 40 and 41. The two ends 10 and 11 are constructed with upper and lower cleats 16 and 17 which reinforce the same and provide nailing strips by means of which the top and bottom of the case may be firmly secured thereto. The case illustrated is a wood case, though it can readily be comprehended that the filler may be used with cases which are constructed of any other suitable material or with a single compartment case if desired. Case A is further provided with a top 18 which is nailed or otherwise secured to the case after the same has been filled with eggs.

The case A may be constructed to hold any number of dozen of eggs depending upon the number of partitions used in the filler and the number of fillers employed. The case shown has been designed for sixty dozen eggs, though it can readily be comprehended that seventy-two dozen or that it may be built to hold any other number of dozen of eggs.

Within the case is placed a number of fillers which are indicated at B, C, D, E and F. These fillers are identical in construction and are each constructed with two sets of partitions, those extending lengthwise of the case being illustrated detached at 19 in Fig. 3, and those extending transversely being indicated at 20. Both sets of partitions are constructed with intersecting slots 21, 26 and 33, by means of which the partitions may be interconnected to form individual cells 22 for the reception of the eggs 23. The partitions 19 and 20 are preferably of the interlocking type and when so constructed, the partitions 19 are formed with openings 24 immediately above the slots 21 and the partitions 20 are constructed with tongues 25 adapted to enter the openings 24 and hold the partitions rigidly locked together.

In the construction of the partitions 19 and 20, the end slots 26 are spaced from the extreme ends of the partitions to leave end members 27 and 28 projecting outwardly beyond the intersecting end partitions. These end members are cut with arcuate edges 29 and 30, whose centers are located at a point 31 at the middle of the partition. The extreme corners of the end members 27 and 28 are curved as designated at 32 with a degree of curvature greater than that of the intervening edges 29 and 30 so that the said edges are smoothly rounded off. In constructing the ends of the filler, the center 31 for the edge 29 may be located any place between the slot 33 and the edge 30 at the opposite end of the partition. I find it preferable, however, to locate the same in the exact center of the partition, as illustrated, so that the length of the filler measured on any line through this filler is substantially equal throughout the major portion of the height of the filler. The length of the partition measured along such line is slightly less than the corresponding inner dimension of the box so that the filler may be readily inserted into the box as will be presently described.

Inasmuch as the invention is used in exactly the same manner when applied to either of the compartments 40 or 41, only its application to compartment 40 will be described in detail.

An egg flat designated at 34 is first placed upon the bottom 15 of the case. The various partitions forming the fillers, if not previously assembled, are assembled to form completed egg case fillers. An egg case filler is then grasped through any of the partitions thereof and lowered into the case. The manner of lowering the case is shown in Fig. 2. In the event that the filler is not maintained parallel to the bottom 15 of the case, the dimensions across the filler being the same throughout the major portion of the height thereof, said filler enters into the case exactly the same as if it were arranged in parallelism to the bottom. When the filler reaches the flat 34, the same assumes a position directly resting thereupon and the eggs may be filled in the filler in the customary manner. After the filler has been filled, a second egg flat, designated at 35 is placed upon the filler F and a second filler E inserted into the case. Other fillers and flats are then successively applied and the various fillers filled with eggs as the filling of the case progresses until the case is entirely full. An upper egg flat 36 may be placed upon the top of the upper filler B and the case closed with the cover 18. In the removal of the eggs from the filler, the fillers may be given a slight twist which serves to grip and hold the eggs in place between the partitions thereof and within the egg cells formed therebetween. While so positioned, the entire filler with the eggs suspended in it may be removed from the case and without causing binding between the corners of the partitions forming the filler, due to the fact that the extreme edges thereof are cut as shown in Fig. 3. Inasmuch as both the partitions 19 and 20 are constructed at their ends in exactly the same manner, the removal of the filler may be accomplished regardless of the manner of twisting or warping the fillers to hold the eggs therein. After the filler has been removed and deposited, the eggs may be removed therefrom for the purpose of candling or inspection and the eggs replaced in the same or in another case by employing the reverse procedure.

My invention is extremely advantageous in that it permits of readily placing the egg fillers into and removing the same from the egg case whether the fillers have eggs within them or are empty. Binding of the ends of the partitions from which the fillers are formed is prevented through the construction of the curved edges thereof. By the sharp curvature at the corners of the filler, the fillers are readily guided into the case, thereby eliminating accurate manipulation of the filler in the insertion of the same into the case. The curving of the ends of the filler and the corners of the same assist in protecting the filler so that the protruding end members of the partitions thereof are prevented from breaking. The invention is exceedingly simple and can be embodied in egg fillers without increasing the cost thereof. An egg filler constructed in accordance with my invention is extremely attractive in appearance.

Changes in the specific form of my invention as herein disclosed may be made within the scope of what is claimed, without departing from the spirit of my invention.

Having described my invention, what I claim as new and desire to protect by Letters Patent is:

1. In combination with an egg case having sides and ends, an egg case filler removable therefrom and comprising a set of partitions extending from end to end of the case and spaced from one another, a second set of partitions extending from side to side of the case and intersecting said first set of partitions, said second set being spaced from one another, the ends of the partitions of one of said sets being constructed with cut away corners so that the length of each of said partitions measured on any line through the center of said partition will be less than the corresponding inner dimension of said case.

2. In combination with an egg case having sides and ends, an egg case filler removable therefrom and comprising spaced intersecting partitions extending between the ends and sides of the case and forming egg receiving cells therebetween, all of said partitions being constructed with cut away corners at the ends thereof so that the length of each partition measured on any line through the center of said partition will be less than the corresponding inner dimension of the case.

3. In combination with an egg case having sides and ends, an egg case filler comprising spaced intersecting partitions extending between the ends and sides of the case and forming egg receiving cells therebetween, said partitions being each constructed at its end with an arcuate edge having a radius substantially equal to one half the corresponding inner dimension of the case.

4. In combination with an egg case having sides and ends, an egg case filler comprising a set of partitions extending from end to end of the case and spaced from one another, a second set of partitions extending from side to side of the case and intersecting said first set of partitions, said second set being spaced from one another, the ends of the partitions of one of said sets being each constructed with an arcuate edge having its center located in said partition at a point between the opposite end of said partition and the first intersecting partition adjacent the medial plane thereof and toward the same end of said partition as said arcuate edge, said partition being of a length measured along any line passing through said center, less than the corresponding inner dimension of the case.

5. In combination with an egg case having sides and ends, an egg case filler comprising a set of partitions extending from end to end of the case and spaced from one another, a second set of partitions extending from side to side of the case and intersecting said first set of partitions, said second set being spaced from one another, the ends of the partitions of one of said sets being each constructed with an arcuate edge having its center located in said partition along a line parallel to the upper and lower edges thereof and midway therebetween, said partition being of a length measured along any line passing through said center, less than the corresponding inner dimension of the case.

6. In combination with an egg case having sides and ends, an egg case filler comprising a set of partitions extending from end to end of the case and spaced from one another, a second set of partitions extending from side to side of the case and intersecting said first set of partitions, said second set being spaced from one another, the ends of the partitions of one of said sets being constructed with an arcuate edge having one degree of curvature at the corners thereof and another degree of curvature at the intervening portion thereof.

7. In combination with an egg case having sides and ends, an egg case filler removable therefrom by sliding along the sides and ends of the case, said filler comprising a set of partitions extending from end to end of the case and spaced from one another, a second set of partitions extending from side to side of the case and intersecting said first set of partitions, said second named partitions being spaced from one another, the ends of all of said partitions being formed with rounded edges so constructed that the ends of said partitions are symmetrical about the medial plane of the filler and about transverse planes through the centers of the partitions, the curvature of the edges of said partitions being such that the length of the partitions measured along any line passing through the center of the partition would be less than the corresponding inner dimension of the case.

8. In combination with an egg case having sides and ends, an egg case filler removable therefrom by sliding along the sides and ends of the case, said filler comprising a set of partitions extending from end to end of the case and spaced from one another, a second set of partitions extending from side to side of the case and intersecting said first set of partitions, said second named partitions being spaced from one another, the ends of all of said partitions being formed with arcuate edges whose centers lie in the medial plane of the filler, the radii of the arcs of said ends being the same at both ends of each partition, the dimensions of the partitions being such that the algebraic sum of the radii of such arcs and the distance between the centers thereof shall not exceed the corresponding dimensions of the case.

In testimony whereof I have affixed my signature.

ALEXANDER S. T. LAGAARD.